July 7, 1942.                G. G. BUTTERMANN                2,289,099
          SELF-CLOSING, DUSTPROOF SUPPORT FOR DISPENSING
                    CASES FOR ICE CREAM CONES
                    Filed March 29, 1940

INVENTOR
Garry George Buttermann

Patented July 7, 1942

2,289,099

UNITED STATES PATENT OFFICE 2,289,099

SELF-CLOSING, DUSTPROOF SUPPORT FOR DISPENSING CASES FOR ICE-CREAM CONES

Garry George Buttermann, Louisville, Ky.

Application March 29, 1940, Serial No. 326,761

2 Claims. (Cl. 312—43)

My invention relates to devices for helping to keep ice-cream cones in a sanitary condition at stores where the cones are intermittently dispensed in retail trade. And one of the objects of my present invention has been to develope a self-closing dust-proof receptacle with its upper end open and adapted to receive closely-fitting the lower end of a dispensing-case for ice-cream cones, in which the cones are methodically packed for dispensing intermittently, as in retail trade. Another object of my invention has been to design said receptacle so that its lower, inner edges would be adapted to arrest rigidly and uniformly the lower edges of said cone-case, as the case is fitted into the open upper end of said receptacle, preparatory to dispensing the cones therein. A further object of my invention has been to devise a self-closing lid on the bottom of said receptacle to afford the cones in the lower, open end of the cone-case in said receptacle, a sanitary protection against the dust and moisture of the surrounding atmosphere. Another object of my invention has been to design two styles of supporting brackets adapted to hold said receptacle and its enclosed cone-case in desirable positions for dispensing the cones packed therein. Other objects of my invention will be disclosed in the progress of this specification.

The foregoing objects which I have had in view, have been attained in my present invention; and my new and useful self-closing, dust-proof support for dispensing-cases for ice-cream cones, illustrated in the accompanying drawing which forms a part of this specification, is a practical device embodying the aforesaid novel means and other new and useful details of construction, arrangement and combination of parts, all of which, together with their functions, will be described in detail with reference to said drawings, and will be definitely pointed out in the claims that follow this description, so that any person skilled in the art, may be able to construct and use this invention.

In said drawing Fig. 1 is a front elevational view of my self-closing, dust-proof support for dispensing-cases for ice-cream cones, showing the receptacle, the flange of the self-closing lid closed and the lower portion of the bracket for attaching the receptacle to a table or the edge of a counter.

Figure 1:
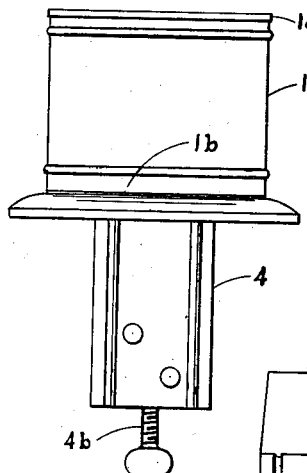

This invention has been designed and experimentally developed in its details of construction for the purpose of producing at a reasonably low cost, a durable, sanitary and ornamental device provided with detachable brackets for anchoring said device in convenient locations, on the wall, a table or on the counter, for supporting the dispensing-cases adapted for the ready sale of ice-cream cones in retail trade. And with this purpose and the special objects aforesaid in view, I will now describe my invention more fully in detail, pointing out the new and useful features of the construction and arrangement of the individual parts and the combinations thereof, as illustrated in the drawing herein described, in which similar letters and characters refer to similar parts throughout the several views.

Figure 4:
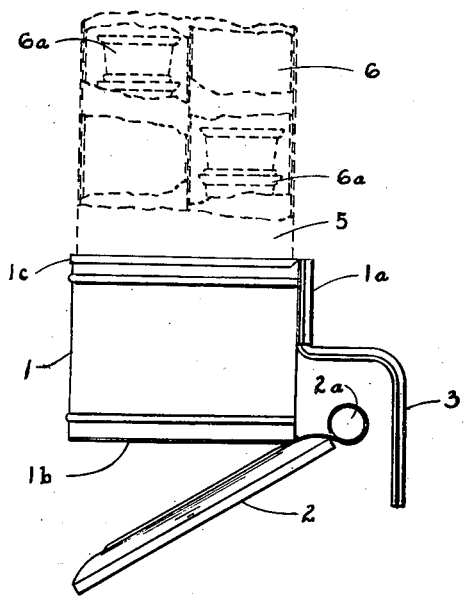
Fig. 4 is a side elevational view of my self-closing, dust-proof support for dispensing-cases for ice-cream cones, with the lid open, showing the lower edge of the rubber cushion and an edge-view of the wall-bracket. The broken lines in this Fig. 4 show the relative position of said dispensing cone-case set normally in said receptacle, with the four cone-tubes therein.
Figure 5:
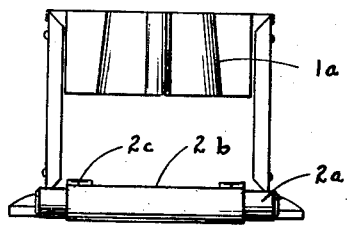
Fig. 5 is an elevational view of the back of the receptacle-portion of said support for the dispensing-cases for ice-cream cones, showing a plan view of the tapered socket for attaching the supporting brackets.

In the invention and development of my new and useful self-closing, dust-proof support for dispensing-cases for ice-cream cones, I have, for the sanitary protection of the ice-cream cones, designed the self-closing, dust-proof receptacle I provided on its lower end with a closely-fitting self-closing lid 2 which opens on a pair of hinges 2c, 2c, on the back of the receptacle I, as shown in Fig. 5. The lid 2, is self-closing by means of gravity since the metal counter-weight 2a held in the casing 2b with a predetermined leverage, is heavy enough to close the lid quickly and efficiently up against the rubber cushion Ib visible in Figs. 1, 2, and 4 around the lower edges of the receptacle I, thus the ice-cream cones held exposed in the open lower end of the cone-case now close-fitting in the receptacle, are afforded a sanitary protection against the dust and fumes of the surrounding atmosphere.

Figure 3:
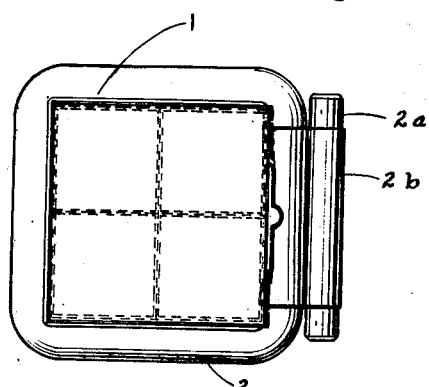
Fig. 3 is a plan view in vertical projection, of the receptacle, showing in broken lines a cross-section of the dispensing-case close-fitting in the receptacle.

In Fig. 4 I have shown in broken lines one of the dispensing-cases for ice-cream cones, fitted into the receptacle I of said support shown in solid lines. In this view I have also shown in dotted lines broken parts of four dispensing-tubes, 6, 6, which are enclosed in said dispensing-case 5, and showing the position of the columns of cones, 6a, 6a, in said tubes. A cross section of these four dispensing cone-tubes is shown in broken lines in Fig. 3. These broken-line illustrations are intended to show the practicability of the cone-case 5 and its self-closing dust-proof support in actual operation in affording sanitary protection to the ice-cream cones, as they are being dispensed intermittently in retail trade. For the cone-tubes, 6, 6, are anchored in the dispensing-case 5 at a predetermined height so that the exposed cones in the lower ends of the four encased cone-tubes, 6, 6, are enclosed in the dust-proof receptacle I of said cone-case support. And inside said receptacle only the lower portion of one cone in each cone-tube, is exposed at one time; and said portion of the lower cone is accessible to the hand of the operator dispensing the cones, as he pushes down the closed lid 2 with the side of his hand and with his thumb and finger pulls one cone from one of the encased cone-tubes, 6, 6. And as soon as he removes his hand, the lid 2 quickly closes, protecting from the dust and fumes of the surrounding atmosphere, the other cones partially exposed in the lower ends of the encased cone-tubes. When the dispensing-operator removes the lower cone from one of the encased cone-tubes, as explained above, the other cones in said tube slip down in the tube and the lower cone in the tube takes the same position in the lower end of said tube as the removed cone occupied.

In like manner, all of the cones in the four encased cone-tubes may be removed one at a time from each tube until all of the cones in the dispensing-case 5 have been dispensed; and then the cone-case 5 is removed from the receptacle and another dispensing-case equipped with the four dispensing cone-tubes is fitted into the receptacle I, with cones therein to be dispensed intermittently in the same way.

Figure 2:
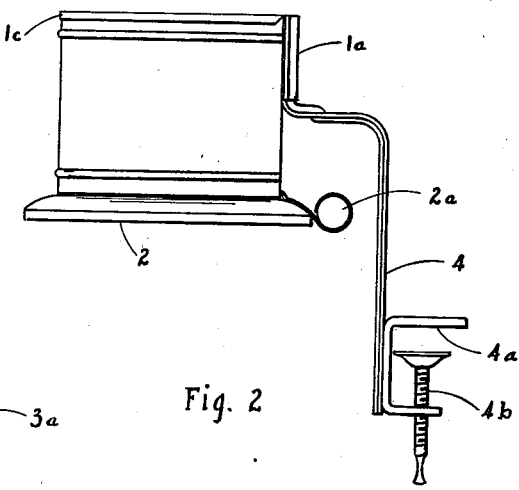
Fig. 2 is a side elevational view of my self-closing, dust-proof support for dispensing-cases for ice-cream cones, showing the side of the case-receptacle and the flange of the self-closing lid, also an end view of the counterweight for closing the lid and a side view of the bracket adapted for fastening the receptacle to a table or a counter.
Figure 6:
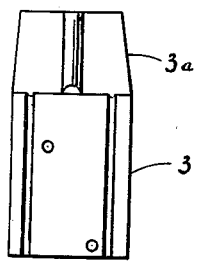
Fig. 6 is an elevational view of the back of the bracket for fastening the device to the wall.

Now, for supporting the receptacle I in convenient locations in a retail store, I have designed two different types of brackets: the bracket 3, shown in Figs. 4 and 6, is designed for installing the receptacle I and its dispensing cone-case on the wall of the room where the cones are to be sold; and the bracket 4 shown in Figs. 1 and 2, with its attachment clamp 4a and its clamping screw 4b, is adapted for mounting the receptacle I with its dispensing cone-case 5 on a table or on the edge of a counter or any similar support. And in order that these two different brackets may be readily interchangeable in their connection with the receptacle I, I have designed a tapered socket Ia and fastened it securely on the back of said receptacle; and on the wall-bracket 3 I have fashioned a corresponding tapered portion 3a thereof, provided with a longitudinal reenforcing bead adapted to fit slidingly into the beaded, tapered socket Ia on the back of said receptacle. And below this tapered portion 3a, the broad wall-bracket 3 is fabricated with two rectangular curves to set the receptacle I for the cone-case out a desirable distance from the wall, and with two parallel, longitudinal reenforcing beads to increase the strength and rigidity of said bracket, in the lower portion of which two screw-holes allow said bracket to be fastened to the wall.

Now, in the bracket 4 adapted to be installed on a table or a counter, the upper portion thereof has been fashioned with taper and bead like the upper portion 3a of bracket 3, and, likewise, designed to fit slidingly into the tapered and beaded socket Ia on the back of the cone-case receptacle I; and below this tapered portion thereof, the bracket 4 is offset a certain distance from its vertically-disposed shank to allow the flange of the lid 2 and the counterweight thereof to function in the clear in the opening and the closing of said lid in dispensing the cones from the receptacle of the cone-case. This said offsetting process I have effected by means of two gracefully curved rectangular bends in the upper part of bracket 4 just below said tapered portion thereof; and near the lower end of the vertically-disposed shank of said bracket, I have fastened an attachment-clamp 4a fitted with a fine-threaded clamping screw 4b, adapted to fasten said bracket securely to a table or a counter in the sales-room.

Around the upper edge of the cone-case receptacle I, I have designed a rounded bead Ic to strengthen that part of the receptacle and, also, to produce smooth edges thereon for fitting the dispensing cone-cases into said receptacle; and below the edge-bead Ic, I have designed two other parallel beads around said receptacle for increasing the strength and rigidity thereof.

From the foregoing it will be seen that I have devised a simple, compact and efficient mechanism for fulfilling the desired objects of this invention, and while these illustrated embodiments of said invention are now deemed preferable, I desire to secure and reserve the right to make such changes or modifications as may fairly fall within the scope of the following claims.

Now, having thus described the various features of my invention, the detail construction, arrangement and combination of its parts, as well as its functions and the ways and means of operation and application; those features and objects of my new self-closing, dust-proof support for dispensing-cases for ice-cream cones, that I consider new and useful, for which I desire Letters Patent granted to me, I have hereinbelow pointed out specifically in the following claims.

I claim:

1. A self-closing dust-proof support for dispensing-cases for ice-cream cones, consisting of a square deep receptacle designed to receive the lower end of the cone-dispensing-case closely-fitting therein and adapted to enclose completely any cones in the lower open end of the cone-case in said receptacle, said receptacle having a rounded integral bead around the upper end thereof designed to strengthen that part of the receptacle and to afford smooth edges thereon for closely-fitting said cone-case in said receptacle; and a rubber cushion fixed around the inner lower edges of said receptacle adapted to arrest positively and uniformly the lower edges of said cone-dispensing case, as the case is fitted down into said receptacle.

2. A self-closing dust-proof support for dispensing-cases for ice-cream cones, as defined in claim 1, including means fixed on the lower part of said receptacle and extending beyond the lower edges thereof for keeping said receptacle closed normally for affording any cones in the lower open end of the cone-case in said receptacle, a sanitary protection against any surrounding atmospheric dust and moisture.

GARRY GEORGE BUTTERMANN.